United States Patent [19]

Dieck

[11] 4,155,391
[45] May 22, 1979

[54] TIRE TRACTION DEVICE

[76] Inventor: Roy W. Dieck, Antigo, Wis.

[21] Appl. No.: 810,102

[22] Filed: Jun. 27, 1977

[51] Int. Cl.² ............................................. B60C 27/00
[52] U.S. Cl. ................................. 152/225 C; 152/217; 254/78
[58] Field of Search ....... 152/225 R, 225 C, 227–230, 152/213 R, 214, 216, 217, 218, 219; 254/78

[56] References Cited

U.S. PATENT DOCUMENTS

| 2,510,451 | 6/1950 | Williams et al. | 152/225 R |
| 2,587,874 | 4/1952 | Mockel | 254/78 X |
| 3,675,897 | 7/1972 | Smith | 254/78 |

Primary Examiner—Albert J. Makay
Assistant Examiner—Donald W. Underwood
Attorney, Agent, or Firm—Harry C. Engstrom; Theodore J. Long; Nicholas J. Seay

[57] ABSTRACT

A traction device having a pair of cleats that mount on the periphery of an automobile tire to provide temporary traction on ice, deep snow, mud and other adverse conditions for on and off the road travel. The cleats are each rigidly mounted to a pair of channels with one of the channels being inserted into the other to allow mounting of the cleats on a wheel. A handle mounted by a linkage to one of the channels engages protruding latches on the other channel, such that rotation of the handle draws the two channels together until the handle reaches a locked position wherein the cleats are firmly held on the tire.

4 Claims, 4 Drawing Figures

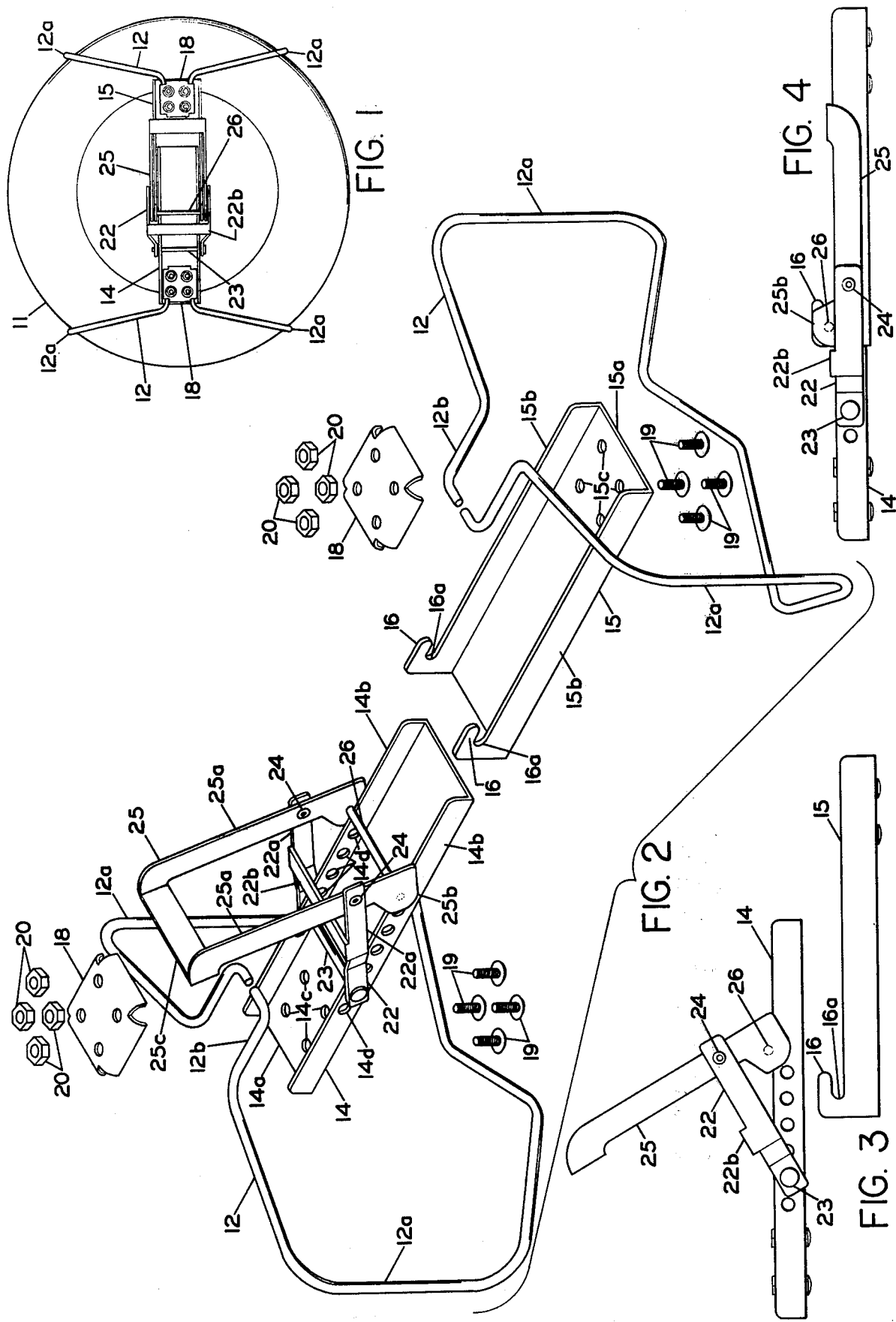

TIRE TRACTION DEVICE

BACKGROUND OF THE INVENTION

1. Field of the Invention

This invention relates generally to removable tire traction devices.

2. Description of the Prior Art

Various devices have been proposed as a substitute for tire chains in providing temporary additional traction in very adverse road conditions. In general terms, the majority of prior traction devices consist of a pair of metal cleats which fit closely on opposite sides of the periphery of a tire, and are clamped or bolted together over the outside of the wheel. Such traction devices are primarily intended for short term emergency use, such as where a car is stuck in a snowdrift or in deep mud. These devices must be portable to allow them to be carried in the car for such emergencies.

The known prior emergency traction devices generally require relatively complex procedures to attach and detach the traction cleats. Often, these procedures involve bolting portions of the devices together, attaching springs, or making size adjustments. These operations are difficult when performed under adverse weather conditions, especially when working within the cramped spaces in the rear wheel well. Some prior devices have not been adapted to allow adjustment to wheels of differing diameters, or have utilized springs in an effort to make one size of traction device fit wheels of several sizes. Many of these devices are unstable once the wheel is in motion because the cleats or "shoes" which fit around the tires are not firmly connected together. A loose connection allows the cleats to move back and forth with respect to one another, causing wear on the tire and vibration, as well as potentially allowing the cleats to twist and break loose from the tire. This problem is particularly serious where springs are utilized to hold the cleats in place on the tire, since dirt or other material getting between the cleat and the tire may extend the springs sufficiently to dislodge the cleat from the tire.

SUMMARY OF THE INVENTION

The automobile tire traction device of my invention utilizes a pair of cleats each rigidly mounted to one of a pair of channels. Each cleat is installed separately on the wheel, with the smaller of the channels then being inserted into and engaged with the larger of the channels. The larger main channel is unobstructed on its top side so as to allow the smaller adjustment channel to be inserted therein from the top, without the necessity of attempting to longitudinally align the channels to slide one channel into the other from the ends thereof. While the terms top, bottom, upright, and the like are used herein referring to the particular orientation of the device shown in FIGS. 2–3 merely to facilitate a clear understanding of the device, it should be understood that the device is oriented on its side when mounted on a tire as shown in FIG. 1. A handle is pivotally mounted by a linkage to the adjustment channel, and has a latch pin which is adapted to engage with hooked latches which extend upwardly from the sides of the main channel. When the handle is moved to its closed position, the handle latch pin engages with the hooked latches to draw the two channels together. The pivotal mounting of the linkage and handle allows the handle to snap into its closed position and stay in this position.

The close fit of the adjustment channel within the main channel prevents lateral movement and twisting between the two channels. Furthermore, the cleats are rigidly mounted to the ends of the channels so that they cannot move back and forth or twist with respect to the channels. However, the cleats are preferably attached to the channels by releasable attachments such that they can be readily removed to replace worn cleats, or to change the size of the cleats for use on tires of different widths. Provision is also made to allow a change in the positioning of the handle linkages on the adjustment channel to adjust my traction device to fit a tire of a different diameter.

Further objects, features, and advantages of my invention will be apparent from the following detailed description taken in conjunction with the accompanying drawings showing a preferred embodiment of a tire traction device exemplifying the principles of my invention.

BRIEF DESCRIPTION OF THE DRAWINGS

In the drawings:

FIG. 1 is a top elevational view of my tire traction device shown illustratively mounted in position on a tire.

FIG. 2 is an exploded perspective view of my tire traction device shown with the parts thereof in position to be assembled.

FIG. 3 is a side elevational view of the channel portions of my device shown in position to be engaged together.

FIG. 4 is a side elevational view of the channel portions of my device shown in engagement.

DESCRIPTION OF THE PREFERRED EMBODIMENT

Referring now more particularly to the drawings, wherein like numerals refer to like parts throughout the several views, a preferred embodiment of my tire traction device is shown generally at 10 in FIG. 1 mounted on a tire 11. The traction device 10 has a pair of cleats 12 which fit over opposite sides of the periphery of the tire, and have portions thereof that extend over the tread of the tire. The cleats are preferably formed of high strength steel rods which are bent to conform to the shape of the outer periphery of the tire and to fit over the tire.

The cleats 12 are sized and shaped to fit a tire of a selected tread width. As best shown in FIG. 2, each cleat 12 has a portion 12a thereof which is formed to extend straight across the tread of the tire and to engage the tread. It is preferred that the tread engaging portions 12a of the cleats be spaced substantially uniformly around the periphery of the tire when mounted on the tire, such as shown in FIG. 1. The substantially uniform spacing of the tread engaging portions helps to provide more uniform gripping of the cleat as the tire rotates, and allows the cleat to fit over a large enough portion of the tire to hold the cleat firmly on the tire despite tangential forces.

A first of the cleats 12 is rigidly attached to one end of an adjustment channel 14. The second of the cleats 12 is rigidly attached to an end of a larger main channel 15. The adjustment channel is formed and sized to fit closely within the main channel and to slide back and forth therein. As explained further below, the two channels are adapted to be drawn tightly together and clamped in a locked position to hold the cleats 12 tightly over the tire.

As shown in FIG. 2, the larger main channel 15 is generally U-shaped, having a flat bottom 15a and upright sides 15b. The top of the main channel is open and unobstructed. A hooked latch 16 protrudes upwardly from each of the sides 15b of the main channel 15. The latches 16 each have a slot 16a therein which opens up toward the end of the channel to which the second cleat 12 is attached.

The adjustment channel 14 is also generally U-shaped, having a flat bottom 14a and upright sides 14b. The channel 14 is slightly smaller than the channel 15 and is adapted to fit closely within the channel 15 for sliding movement therein. The close fit of the channel 14 into the channel 15 insures that the two channels will not twist or move laterally with respect to each other.

As further shown in FIG. 2, each of the cleats 12 is releasably but firmly mounted to one or the other of the channels 14 or 15 by a clip plate 18 which fits over a stub end 12b of the cleats 12. Attachment bolts 19 are passed through holes 14c and 15c in the adjustment channel and the main channel respectively, and through corresponding holes in the clip plates 18, with attachment nuts 20 being screwed down onto the bolts to firmly and rigidly press the clip plates 18 down onto the stub ends of the cleats. The clip plates 18 are preferably formed as shown in FIG. 2, with the sides of the clip plate being bent down to engage the bottoms of the channels 14 and 15, while providing openings at the corners of the clip plate which are large enough to fit over the rod-shaped material of which the cleats 12 are formed. The clip plates can thus be easily removed to allow replacement of worn cleats, or to put in a replacement cleat that has a different size to accommodate a tire of a different width.

Because the top of the main channel 15 is unobstructed, the smaller adjustment channel 14 can be inserted directly into the main channel. This is in contrast to numerous tire traction devices in which members attached to the cleats must be inserted into one another from the ends thereof in telescoping relation. It is apparent that the structure of my tire traction device allows the cleats to be easily emplaced on the tires, since each cleat can be individually placed in position on the tire before the adjustment channel 14 is inserted into the main channel 15.

The means for attaching and securing the adjustment channel 14 to the main channel 15 is best illustrated in FIG. 2. A handle linkage 22 is pivotally mounted to the adjustment channel 14 by a clevis pin 23. The handle linkage 22 consists of a pair of parallel side arms 22a rigidly connected by a lateral abutment member 22b. The side arms 22a are pivotally mounted at pivot points 24 to a handle 25. The handle 25 includes a latch pin 26 rigidly mounted in a laterally disposed position at one end of the handle. The double pivotal mounting of the handle 25 allows the latch pin 26 to be moved longitudinally along the top of the channel 14 as the handle 25 is rotated. It is further seen from the top view of FIG. 1 that the side arms 22a of the linkage 22, and the side members 25a of the handle 25, are spaced farther apart in lateral relation than the sides of either the adjustment channel 14 or the main channel 15. Thus, the adjustment channel can be inserted into the main channel without interference by either the linkage or the handle, provided that the clevis pin 23 is clear of the main channel.

My tire traction device is emplaced upon a tire by individually placing each of the cleats 12 around the outer periphery of the tire and placing the channels 14 and 15 in the relative position shown in FIG. 3, wherein the channel 14 is just above the channel 15. The adjustment channel 14 may then be inserted downwardly into the channel 15. The handle 25 can then be moved by the user until the latch pin 26 (not shown in FIG. 3) engages the top of the channel 15 in front of the hooked latches 16. As the handle 25 is rotated downwardly to its closed and locked position shown in FIG. 4, the latch pin 26 will move into the slots 16a of the hooked latches 16. In this position, the latch pin is restrained by the latches from movement in every direction except directly out of the latch slots 16a. The latch pin will not move out of the latch slots since the cleats are clamped tightly over the tire, which tends to pull the channels 14 and 15 apart and forces the latch pin into the slots. Moreover, any inward movement of the channels will be restrained as the backs of the extending latches 16 engage the lateral abutment member 22b of the handle linkage. Such engagement positively prevents movement of the latch pin 26 out of the slots 16a when the cleats 12 are in contact with the road surface. The two channels cannot be pulled apart or out of engagement when the handle is in its closed position because the latch pin is firmly linked to the adjustment channel by the handle 25 and the linkage 22.

As best shown in FIG. 4, the latch pin 26 is preferably mounted to the handle 25 at side member extensions 25b which extend up above the remainder of the handle and above the adjustment channel when the handle is in its closed position. When the handle 25 is in its closed position, the latch pin 26 is in a position above the sides of the adjustment channel and the main channel 15, and of course, in engagement with the hooked latches 16. Any external forces tending to draw the channels apart will exert a force on the latch pin 26 which will tend to drive the handle downwardly to its closed position rather than tending to drive the handle open. Further downward movement of the handle is restrained by engagement of a lateral brace portion 25c of the handle with the sides of the main channel.

Since tire sizes vary, it is desirable to provide a means to adjust the spacing of the cleats 12 to accommodate tires of different diameters. In my tire traction device 10, the adjustment of the spacing of the two cleats 12 is preferably provided by changing the longitudinal point of attachment of the clevis pin 23 to the adjustment channel 14. As shown in FIG. 2, a plurality of pairs of holes 14d are spaced along the opposite sides of the adjustment channel 14. The clevis pin is adapted to be inserted through a selected pair of these holes to provide a detachable pivotal mounting of the handle linkage 22 to the adjustment channel. The clevis pin is secured to prevent it from slipping out of the holes, for example, by providing a flange at one end of the clevis pin and a removable cotter pin (not shown) attached to the other end.

It is understood that my invention is not confined to the particular construction and arrangement of parts herein illustrated and described, but embraces all such modified forms thereof as come within the scope of the following claims.

I claim:

1. A tire traction device comprising:
   (a) a pair of cleats each adapted to fit over and engage a portion of the periphery of a tire;

(b) an adjustment channel rigidly attached to a first of said cleats, the sides of said adjustment channel having a plurality of pairs of holes formed therein;

(c) a U-shaped main channel having a flat bottom and upright sides, said main channel being rigidly attached to the second of said cleats and having an unobstructed top to allow insertion of said adjustment channel therein from the top, said adjustment channel fitting closely within said main channel and being longitudinally slidable therein;

(d) a hooked latch extending from each of the upright sides of said main channel;

(e) a handle having a laterally extending latch pin mounted at one end thereof, said latch pin being adapted to engage with said hooked latches and to be held therein; and (f) linkage pivotally mounted to said adjustment channel and to said handle such that when said adjustment channel is inserted and slidably engaged in said main channel said handle can be pivoted to a closed position wherein said latch pin is engaged and held by said hooked latches to thereby hold said adjustment channel and said main channel in engagement, said linkage having a pair of parallel side links and a clevis pin pivotally mounting said side links to the side walls of said adjustment channel, and said clevis pin being insertable in any selected pair of the holes in said adjustment channel to provide desired spacing of said cleats when said adjustment channel and said main channel are engaged and said handle is in its closed position.

2. A tire traction device comprising:

(a) an adjustment channel;

(b) a U-shaped main channel having a flat bottom and upright sides and having an unobstructed top to allow insertion of said adjustment channel therein from the top, said adjustment channel fitting closely within said main channel and being longitudinally slidable therein;

(c) a pair of cleats each adapted to fit over and engage a portion of the periphery of a tire, a first of said cleats having a stub end thereof which is adapted to fit within said adjustment channel and the second of said cleats having a stub end portion which is adapted to fit within said main channel, each said stub end of said cleats being engaged to its respective channel by a clip plate which fits over said stub end to engage the same against such channel, and wherein said clip plates are releaseably secured to said channels;

(d) a hooked latch extending from each of the upright sides of said main channel;

(e) a handle having a laterally extending latch pin mounted at one end thereof, said latch pin being adapted to engage with said hooked latches and to be held therein; and (f) linkage pivotally mounted to said adjustment channel and to said handle such that when said adjustment channel is inserted and slidable engaged in said main channel said handle can be pivoted to a closed position wherein said latch pin is engaged and held by said hooked latches to thereby hold said adjustment channel and said main channel in engagement.

3. The tire traction device of claim 2 wherein said cleats are formed of rod material of circular cross-section, and said clip plates are formed of a flat plate having the edges thereof bent downwardly to make contact with said channels and having openings at the corners thereof adapted to fit over said rod material of said cleats.

4. A tire traction device comprising:

(a) a pair of cleats each adapted to fit over and engage a portion of the periphery of a tire;

(b) an adjustment channel having side walls and rigidly attached to a first of said cleats;

(c) a U-shaped main channel having a flat bottom and upright sides, said main channel being rigidly attached to the second of said cleats and having an unobstructed top to allow insertion of said adjustment channel therein from the top, said adjustment channel fitting closely within said main channel and being longitudinally slidable therein;

(d) a hooked latch extending from each of the upright sides of said main channel;

(e) a handle having a laterally extending latch pin mounted at one end thereof, said latch pin being adapted to engage with said hooked latches and to be held therein, said handle having two side members and extensions of said side members which extend above said adjustment channel when said handle is in its closed position, said latch pin being mounted in said extensions of said handle side members such that when said handle is in its closed position said latch pin will be in engagement with said hooked latches in a position above said adjustment channel and said main channel, whereby external forces tending to draw said channels apart will exert a force on said latch pin which will tend to maintain said handle in its closed position; and (f) linkage including a pair of parallel side links pivotally connected to the two side members of said handle, a lateral abutment member rigidly connected to and extending laterally between said side links, and a clevis pin pivotally mounting said side links to the side walls of said adjustment channel, such that when said adjustment channel is inserted and slidably engaged in said main channel said handle can be pivoted to a closed position wherein said latch pin is engaged and held by said hooked latches to thereby hold said adjustment channel and said main channel in engagement, and wherein said lateral abutment member is positioned such that inward movement of said main channel and adjustment channel will bring said lateral abutment member into engagement with said hooked latches to thereby restrain further inward movement.

* * * * *